US010543926B2

(12) United States Patent
Povroznik, III et al.

(10) Patent No.: US 10,543,926 B2
(45) Date of Patent: Jan. 28, 2020

(54) ICE PROTECTION SYSTEMS

(71) Applicant: Sikorsky Aircraft Corporation, Stratford, CT (US)

(72) Inventors: Stephen B. Povroznik, III, Milford, CT (US); Darryl A. Tetrault, Wallingford, CT (US); Timothy R. Budd, Stratford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 371 days.

(21) Appl. No.: 15/368,062

(22) Filed: Dec. 2, 2016

(65) Prior Publication Data

US 2017/0174349 A1    Jun. 22, 2017

Related U.S. Application Data

(60) Provisional application No. 62/270,343, filed on Dec. 21, 2015.

(51) Int. Cl.
| *B64D 15/12* | (2006.01) |
| *B64D 15/22* | (2006.01) |
| *B64C 27/473* | (2006.01) |
| *B64D 15/20* | (2006.01) |
| *B64D 15/14* | (2006.01) |

(52) U.S. Cl.
CPC ............ *B64D 15/12* (2013.01); *B64C 27/473* (2013.01); *B64D 15/14* (2013.01); *B64D 15/20* (2013.01); *B64D 15/22* (2013.01)

(58) Field of Classification Search
CPC ........ B64D 15/12; B64D 15/22; B64D 15/20; B64D 15/15; B64D 15/14; B64C 27/473

USPC ............................................................ 416/1
See application file for complete search history.

(56) References Cited

U.S. PATENT DOCUMENTS

| 5,313,202 | A | * | 5/1994 | Hansman, Jr. | G08B 19/02 244/134 R |
| 2003/0178412 | A1 | * | 9/2003 | Goldberg | B64D 15/12 219/497 |
| 2007/0295712 | A1 | * | 12/2007 | Forman | B64D 15/14 219/492 |
| 2008/0257033 | A1 | * | 10/2008 | Roberts | B64D 15/20 73/170.26 |
| 2009/0149997 | A1 | * | 6/2009 | Stothers | B64D 15/12 700/275 |
| 2010/0065541 | A1 | * | 3/2010 | Henze | B64D 15/12 219/202 |
| 2011/0036950 | A1 | * | 2/2011 | Guillermond | B64D 15/12 244/134 R |
| 2012/0256053 | A1 | * | 10/2012 | McCollough | H05B 6/80 244/134 F |
| 2014/0097177 | A1 | * | 4/2014 | Rochell | G05D 23/19 219/486 |
| 2014/0191084 | A1 | * | 7/2014 | Gambino | B64D 15/12 244/134 D |

(Continued)

*Primary Examiner* — Mahmoud Gimie
(74) *Attorney, Agent, or Firm* — Cantor Colburn LLP

(57) ABSTRACT

A rotary blade includes a blade body, one or more heater elements, and a temperature sensing circuit. The one or more heater elements are connected to the blade body. The temperature sensing circuit is in thermal communication with the blade body and is electrically isolated from the one or more heater elements for determining actual temperature of the rotary blade independent of operation of the one or more heater elements.

19 Claims, 5 Drawing Sheets

(56) References Cited

U.S. PATENT DOCUMENTS

| | | | | |
|---|---|---|---|---|
| 2015/0174843 A1* | 6/2015 | Crepin | ............ | B64C 9/22 |
| | | | | 264/258 |
| 2015/0292351 A1* | 10/2015 | Pereira | ............ | B64D 15/12 |
| | | | | 219/205 |
| 2015/0346122 A1* | 12/2015 | Stothers | ............ | B64D 15/14 |
| | | | | 702/130 |
| 2016/0003147 A1* | 1/2016 | Merlo | ............ | B64D 15/12 |
| | | | | 60/39.093 |
| 2016/0130006 A1* | 5/2016 | Brouwers | ............ | B64D 15/12 |
| | | | | 416/1 |
| 2016/0221680 A1* | 8/2016 | Burton | ............ | B64D 15/12 |

\* cited by examiner

ICE PROTECTION SYSTEMS

CROSS-REFERENCE TO RELATED APPLICATION

This application claims the benefit of priority under 35 U.S.C. § 119(e) to U.S. Provisional Application No. 62/270,343, filed Dec. 21, 2015, which is incorporated herein by reference in its entirety.

BACKGROUND OF THE INVENTION

1. Field of the Invention

The present disclosure relates to rotary blades, and more particularly to ice protection for rotary blades.

2. Description of Related Art

Aircraft can sometimes encounter icing conditions during flight. Icing conditions occur when the atmosphere is laden with water droplets of super cooled liquid water. Because the liquid water is super cooled, droplets that come into contact with the aircraft can attach to various aircraft surfaces, freeze, and form ice accretions. Ice accretions can present challenges to aircraft during flight because they have the potential to change aircraft performance, such as by reducing available engine power, increasing aircraft weight, altering the aerodynamics of lift-generating surfaces, and the altering the responsiveness of flight control devices. For that reason, some aircraft include ice protection systems. Ice protection systems are generally operable to prevent ice formation and/or remove ice accretions from aircraft structures, and include devices like boots or heaters. Such devices are generally arranged in proximity to structures prone to ice accretions, and can be selectively engaged once atmospheric conditions are encountered which may be conducive to icing. Such heaters are typically operated such that the heater raises the temperature of the associated aircraft structure to a temperature above which ice accretions can develop, but below temperatures at which the strength or integrity of the heated structure can be compromised.

Such conventional ice protection methods and systems have generally been considered satisfactory for their intended purpose. However, there is still a need in the art for improved ice protection systems. The present disclosure provides a solution for this need.

SUMMARY OF THE INVENTION

A rotary blade includes a blade body, one or more heater elements, and a temperature sensing circuit. The one or more heater elements are connected to the blade body. The temperature sensing circuit is in thermal communication with the blade body and is electrically isolated from the one or more heater elements for determining actual temperature of the rotary blade independent of operation of the one or more heater elements.

In certain embodiments, the rotary blade can include a spar. The spar can have an interior and an exterior. The interior can include a longitudinal cavity defined within the spar interior. The temperature sensing circuit can be disposed within the interior cavity of the spar. The temperature sensing circuit can be disposed on the exterior of the spar. The rotary blade can include a composite body, and the temperature sensing circuitry can be disposed with the composite body. The temperature sensing circuit can be in thermal communication with the one or more heater elements for determining the actual temperature of portions of the rotary blade heated by the one or more heater elements, such as a composite portion of the rotary blade by way of non-limiting example.

In accordance with certain embodiments, the blade body can define a leading edge, an upper airfoil surface extending from the leading edge of the blade body, and a lower airfoil surface coupled to the upper airfoil surface at the leading edge. A profile of the heater element can span the leading edge, a portion of the upper airfoil surface adjacent to the leading edge, and a portion of the lower airfoil surface adjacent to the leading edge. The heater element can be conformally disposed over a portion of the blade body, such as the leading edge and portions of the upper and lower surfaces of the blade body.

It is also contemplated that, in accordance with certain embodiments, the heater circuit can include source and return leads. The source and return leads can be disposed on a root portion of the blade body and be electrically connected to the heater element. The temperature sensing circuit can include source and return leads. The source and return leads can be disposed on the root portion of the blade body and can be electrically isolated from the source and return leads of the heater element. The temperature sensing circuit can also include a wire segment connected to the temperature sensing circuit source and return leads. The wire segment can span an axial length of the heater element. The wire segment can extend to a point on the blade body disposed outboard of the heater element.

A rotorcraft includes one or more rotor systems having first and second rotary blades as described above. A control module is communicative with the temperature sensing circuits of the one or more rotary blades and is operatively associated with the one or more the heater elements coupled to each of the one or more rotary blades. The control module is also communicative with a memory having instructions recorded thereon that, when read by the control module, cause the control module to (a) determine actual temperature of either of both the rotary blades using the temperature sensing circuit of the respective rotary blade, (b) compare the actual temperature to a temperature thresholds associated with the rotary blade, and (c) control the temperature of the rotary blade based on the comparison of the actual temperature of the rotary blade and the temperature threshold.

In embodiments, a user interface can be connected to the control module, and the instructions can further cause the control module to provide a malfunction indication if the comparison indicates that the actual temperature is above the temperature threshold. The instructions can cause the control module to cease heating the blade body if the comparison indicates that the actual temperature of the rotary blade is above the temperature threshold. The memory can include one or more comparison modules associated with the respective rotary blades, and the instructions can further cause heating of one blade to be independent of the actual temperature and/or heating of another blade.

In accordance with certain embodiments, the memory can include a correlation table associating resistance of the sense circuit of a respective rotary blade with the actual blade temperature. The memory can include a plurality of temperature thresholds, a first of the plurality of temperature thresholds being associated with a first of the rotary blades, and a second of the plurality of temperature thresholds being associated with a second of the rotary blades. The first and second rotary blades can be main rotor blades, tail rotor blades, or both main and tail rotor blades.

A method monitoring ice accretion control on a rotary blade includes (a) controlling ice accretion by cyclically applying power to a heater element coupled to the rotary blade, (b) determining the actual temperature of a rotary blade, (c) comparing the actual temperature of the rotary blade to a temperature threshold, and (d) ceasing the cyclical application of power to the heater element using the comparison of the actual temperature of the rotary blade and the temperature threshold.

In certain embodiments, the method can include providing a malfunction indicator to a user interface if the actual blade temperature is greater than the temperature threshold. Determining the actual temperature can include determining resistance of a temperature sensing circuit as described above, and correlating the resistance of the temperature sensing circuit to actual temperature of the rotary blade. In accordance with certain embodiment, the rotary blade can be first rotary blade and the method can include (e) controlling ice accretion on a second rotary blade by cyclically applying power to a heater element coupled to the second rotary blade, (f) comparing the actual temperature of the second rotary blade to the temperature threshold, and (g) ceasing the cyclical application of power to the heater element using the comparison of the actual temperature of the second rotary blade and the temperature threshold. It is contemplated that the determining the actual temperature of the rotary blade can be independent of ice accretion control and cyclical application of power to the one or more heater elements.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
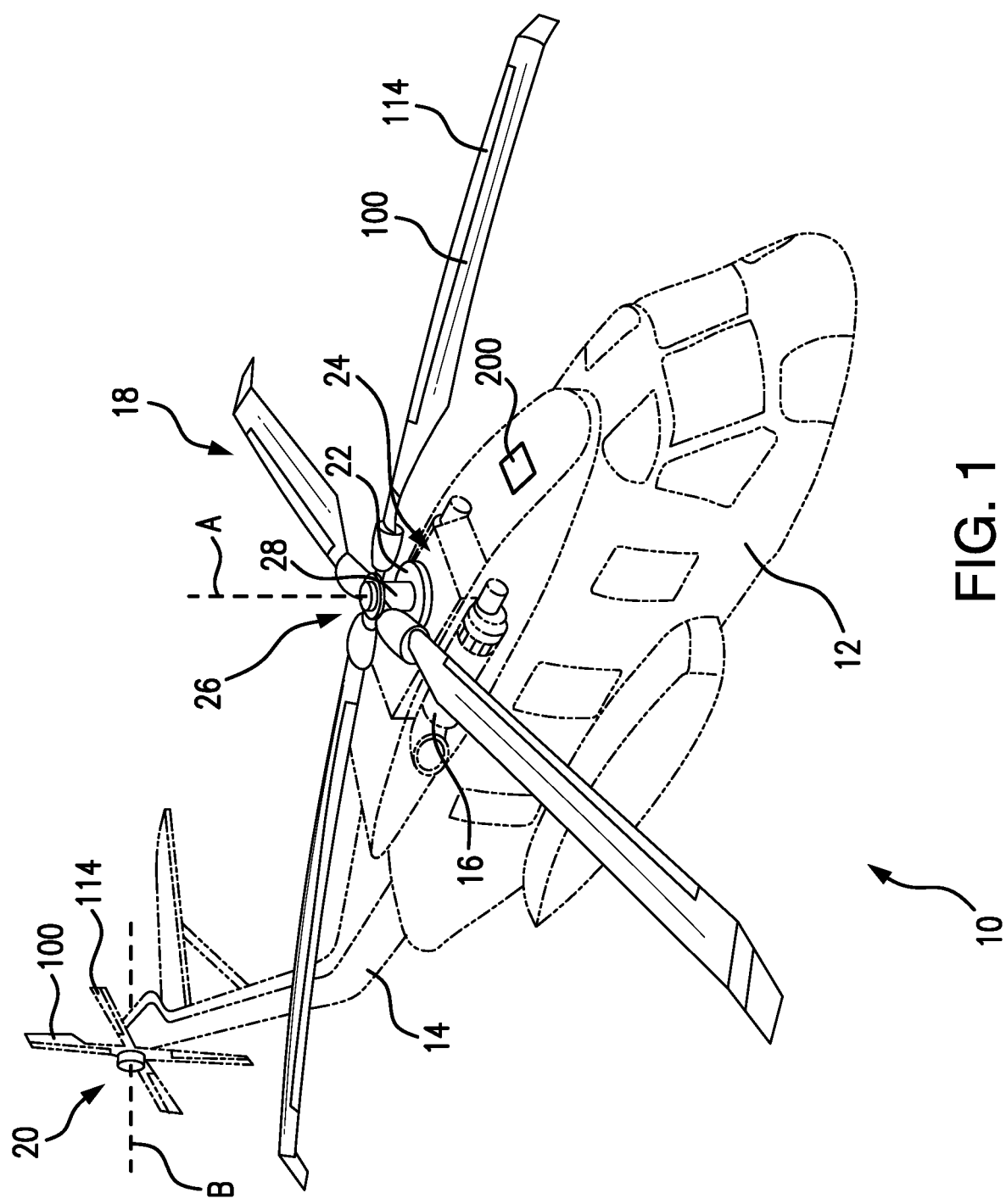
FIG. 1 is a schematic perspective view of an exemplary embodiment of a rotorcraft constructed in accordance with the present disclosure, showing main and tail rotor systems with rotary blades.

Reference will now be made to the drawings wherein like reference numerals identify similar structural features or aspects of the subject disclosure. For purposes of explanation and illustration, and not limitation, rotorcraft with a rotor ice protection system in accordance with the disclosure is shown in FIG. 1 and is designated generally by reference character 10. Other embodiments of rotorcraft and rotorcraft rotor ice protection systems are provided in FIGS. 2A-5, as will be described. The systems and methods described herein can be used in rotorcraft, such as in helicopters and/or rotorcraft with dual, counter-rotating rotor systems, however the invention is not limited to any particular type of aircraft or to aircraft in general.

Referring now FIG. 1, rotorcraft 10 is shown. Rotorcraft 10 includes an airframe 12 with a longitudinally-extending tail 14. Airframe 12 includes one or more engines 16. A main rotor system 18 and tail rotor system 20 are rotatably supported by airframe 12, tail rotor system being mounted to longitudinally-extending tail 14 and configured as an anti-torque rotor system. A transmission 22 and a gearbox 24 are disposed within airframe 12 and connect main rotor system 18 and tail rotor system 20 with engine 16 for providing rotation to main rotor system 18 and tail rotor system 20. Main rotor system 18 includes a plurality of rotary blades 100 coupled to a main rotor hub 26, which in turn connected to transmission 22 through a main rotor shaft 28 and is rotatable about a main rotor system rotation axis A. Tail rotor system 20 is similar in arrangement, includes a plurality of tail rotary blades 100, and is rotatable about a tail rotor system rotation axis B. Although a particular rotorcraft and rotor systems configuration are illustrated and described in the present disclosure, other configurations and/or machines, such as ground vehicles, jet aircraft, turbofan engines, high speed compound rotary wing aircraft with supplemental translational thrust systems, dual contra-rotating, coaxial rotor system aircraft, turbo-props, tilt-rotors and tilt-wing aircraft, will also benefit from the present invention.

Rotorcraft 10 includes a rotor ice protection system (RIPS) 200. RIPS 200 is operably connected to a plurality of heater elements 114 connected to individual rotary blades 100 that are configured limiting and/or removing ice accretions that could otherwise form (or persist) on rotorcraft structure(s) in proximity to the respective heater elements. In this respect RIPS 200 is configured and adapted to receive information relating the ambient environment external to rotorcraft 10, determine whether icing conditions exist, and when it is determined that icing conditions exists, selectively heat various aircraft structures to prevent and/or remove ice accretions from surfaces of rotorcraft 10 that would otherwise acquire ice. In embodiments, RIPS 200 is configured for active operation, and commences heating of rotorcraft structure(s) in response to an input from a user interface, e.g., a switch operated by a crewman. In certain embodiments, RIPS 200 is configured for passive operation, and engages commences heating of rotorcraft structure(s) upon determination from received input that that icing conditions exist in the environment external to rotorcraft 10. It is contemplated that heating may be zoned, respective heater mats of tail rotor system 20 being daisy chained together into a single zone and heater mats of connected to a given main rotor blade of main rotor system 18 being zoned daisy chained together into a common zone for example.

Figure 2A:
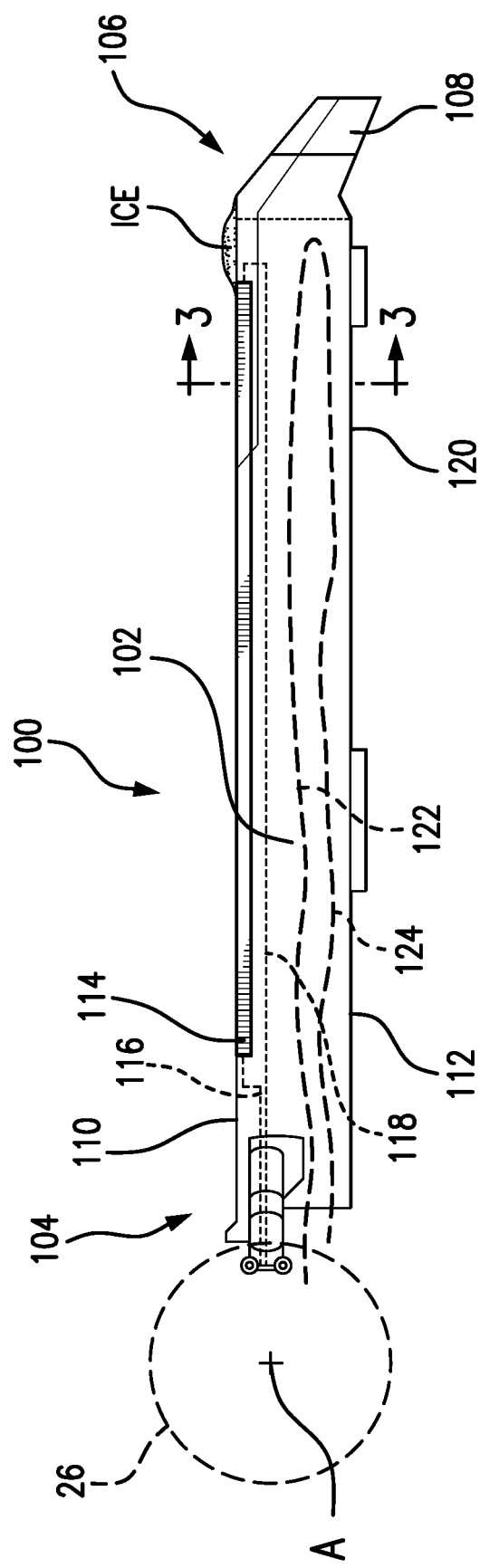
FIGS. 2A and 2B are schematic spanwise plan views of a rotary blade of the main rotor system of the rotorcraft of FIG. 1, showing a blade body with a heater element and a temperature sensing circuit for determining the actual temperature of the rotary blade.
Figure 2B:
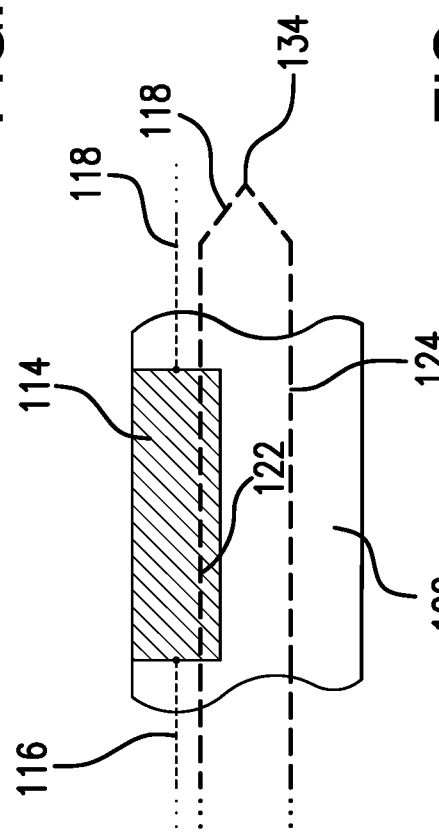

With references to FIGS. 2A and 2B, rotary blade 100 is shown. Rotary blade 100 includes a blade body 102 defining a longitudinal axis L with a root portion 104, a tip portion 106, and a tip cap 108. Root portion 104 is disposed at an inboard end of blade body 102 and couples to main rotor hub 26 for common rotation therewith about main rotation axis A. Blade body 102 defines a leading edge 110 and a trailing edge 112 disposed on opposite sides of longitudinal axis L. As will be appreciated by those of skill in the art, ice accretion may develop over portions of rotary blade 100 during operation in icing conditions. Because such ice accretion can alter the performance of rotary blade 100, rotary blade 100 includes one or more heater elements, a single heater element 114 being shown in FIGS. 2A and 2B for purposes of illustration and not limitation.

Heater element 114 is disposed over a portion of blade body 102 and is configured for resistively heating blade body 102 using electric power provided to heater element 114 through a source lead 116 and a return lead 118. Source lead 116 is coupled to root portion 104 and extends along a length of blade body 102 to heater element 114. Return lead 118 extends form heater element 114 to root portion 104, is connected to root portion 104. Source lead 116 and return lead 118 are both electrically connected to source of electrical power carried by airframe 12 (shown in FIG. 1), application of the electrical power to heater element 114 being controlled by RIPS 200.

RIPS 200 controls the application of electrical power to heater element 114 through elements remote from rotary blade 100. For example, in one contemplated embodiment, a RIPS 200 includes a control module 202 (shown in FIG. 4) communicative with an air data computer 50 (shown in FIG. 4), an ice rate controller 52 (shown in FIG. 4), and an ice rate probe 54 (shown in FIG. 4). Air data computer 50 communicates flight and environmental information to control module 202, such as airspeed and outside air temperature (OAT) by way of non-limiting example.

Figure 4:
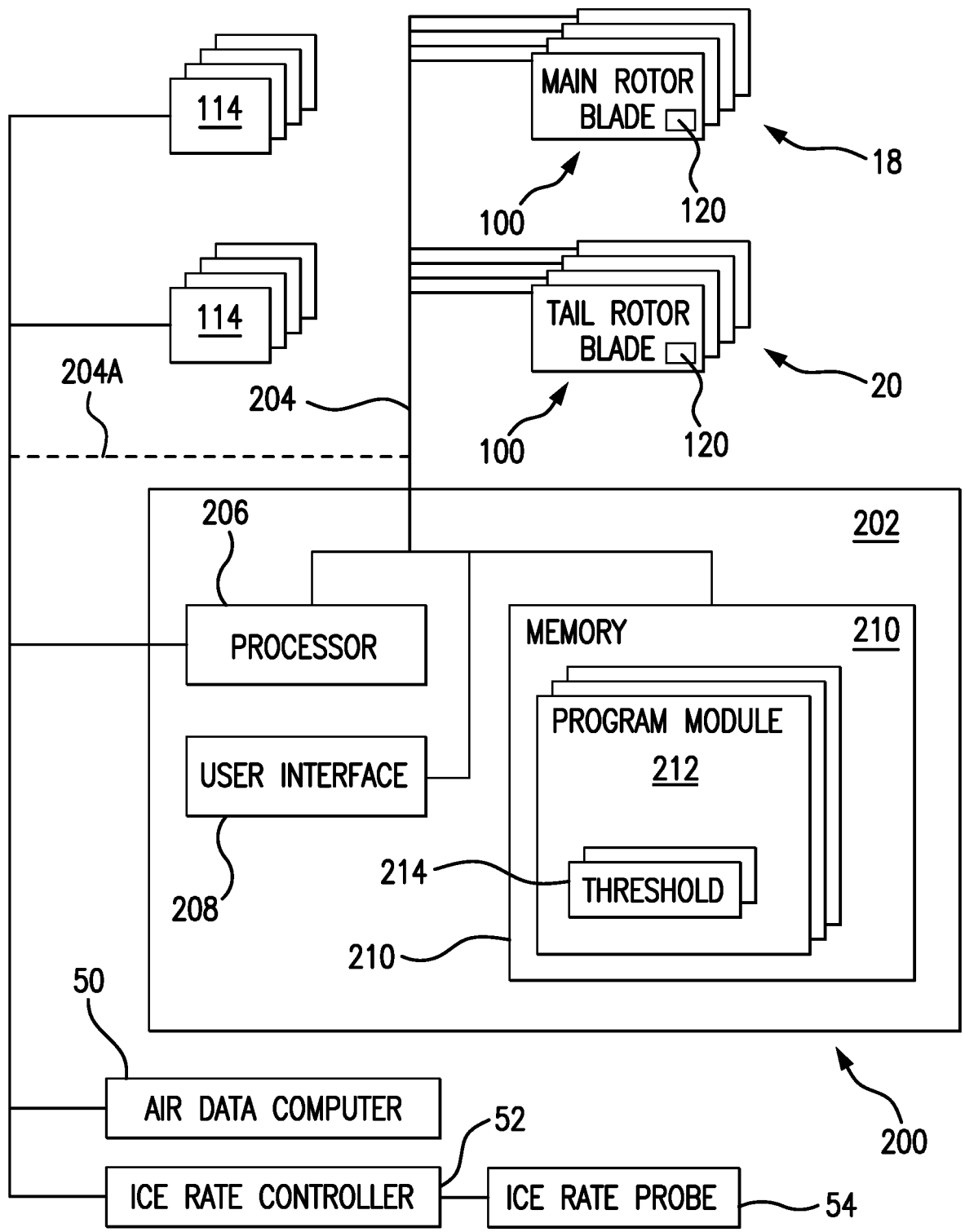
FIG. 4 is a schematic view of an ice protection system for the rotorcraft of FIG. 1, showing a control module of the ice protection system.

In the exemplary embodiment shown in FIG. 4, a remote sensor is used to estimate the environmental conditions of the rotary blades. In this respect, ice rate probe 54 is fixed to an exterior of airframe 12 (shown in FIG. 1), and returns a signal that is a function of a reference signal provided by ice rate controller 52 and the vibratory response of ice rate probe 54. As ice accumulates on ice rate probe 54 the probe vibratory response changes, modulating the frequency response in a signal returned to ice rate controller by ice rate probe 54. Control module 202 cyclically applies power to heater element 114 using the flight and environmental information from the air data computer in conjunction with the ice rate signal returned from ice rate probe 54.

One challenge with controlling heater elements 114 using information acquired remotely from a sensor remote from the rotary blade is that the temperature of the structure adjacent to the heater is determined indirectly, e.g., inferentially While satisfactory for its intended purpose, some aircraft certification bodies like the Federal Aviation Administration (FAA) deem such heaters capable of damaging structure proximate the heater under certain circumstances, and require risk reduction measures in view of the deemed hazard. Accordingly, in the embodiments illustrated in FIGS. 2A-4, rotary blade 100 includes a temperature sensing circuit 120 for determining actual temperature of structure of blade body 102. Actual temperature as used herein refers to a direct measurement of rotary blade structure on rotary blade 100 as opposed to being inferred using data acquired by a remote sensor, such as ice rate sensor 54 disposed off rotary blade 100.

Temperature sensing circuit 120 includes a source lead 122, a return lead 124, and a wire segment 136. Source lead 122 and return lead 124 are fixed to root portion 104 of blade body 102. Wire segment 136 electrically connects source lead 122 with return lead 124, spans and overlays a length of heater element 114, and extends to a point 134 that is disposed outboard of heater element 114. This increases the sensitivity of temperature sensing circuit 120 to temperature change in portions of rotary blade in contact with heater element 114, providing more rapidly detection of heater malfunction and/or a temperature excursion event proximate heater element 114.

Source lead 122 and return lead 124 are electrically connected to RIPS 200 (shown in FIG. 1), and RIPS 200 is configured and adapted to measure resistances of temperature sensing circuit 120, which will change as a function of temperature. By way of non-limiting example, temperature sensing circuit 120 may include chromel wire or any other suitable wire. Based on the measured resistance of temperature sensing circuit 120, RIPS 200 determines the actual temperature of blade body 102. While described in terms of measuring resistance change associated with temperature change, it is to be understood and appreciated that other temperature sensing circuit could be used which are not resistance based, such as temperature transducers.

Direct connection of source lead 122 and return lead 124 to rotary blade 100 in conjunction with electrical isolation from source lead 116 and return lead 118 enables RIPS 200 to determine the actual temperature of structure adjacent to heater element 114. RIPS 200 can therefore compare the actual temperature of the structure to a predetermined temperature limit and limits operation of heater element 114 in the event that the actual temperature exceeds the predetermined limit RIPS 200 makes the determination and, as appropriate, limits operation of heater element 114 independently of current applied to heater element 114. Independent measurement of the actual temperature of rotary blade 100 using temperature sensing circuit 120 allows for mitigating the risk that heater element 114 could excessively or potentially damage rotary blade structure in proximity of heater element 114 in the event of a malfunction or operational error. This provides additional risk reduction for the RIPS system, satisfying the risk reduction requirements imposed by some aircraft certification bodies on rotorcraft mounting ice protection systems.

Figure 3:
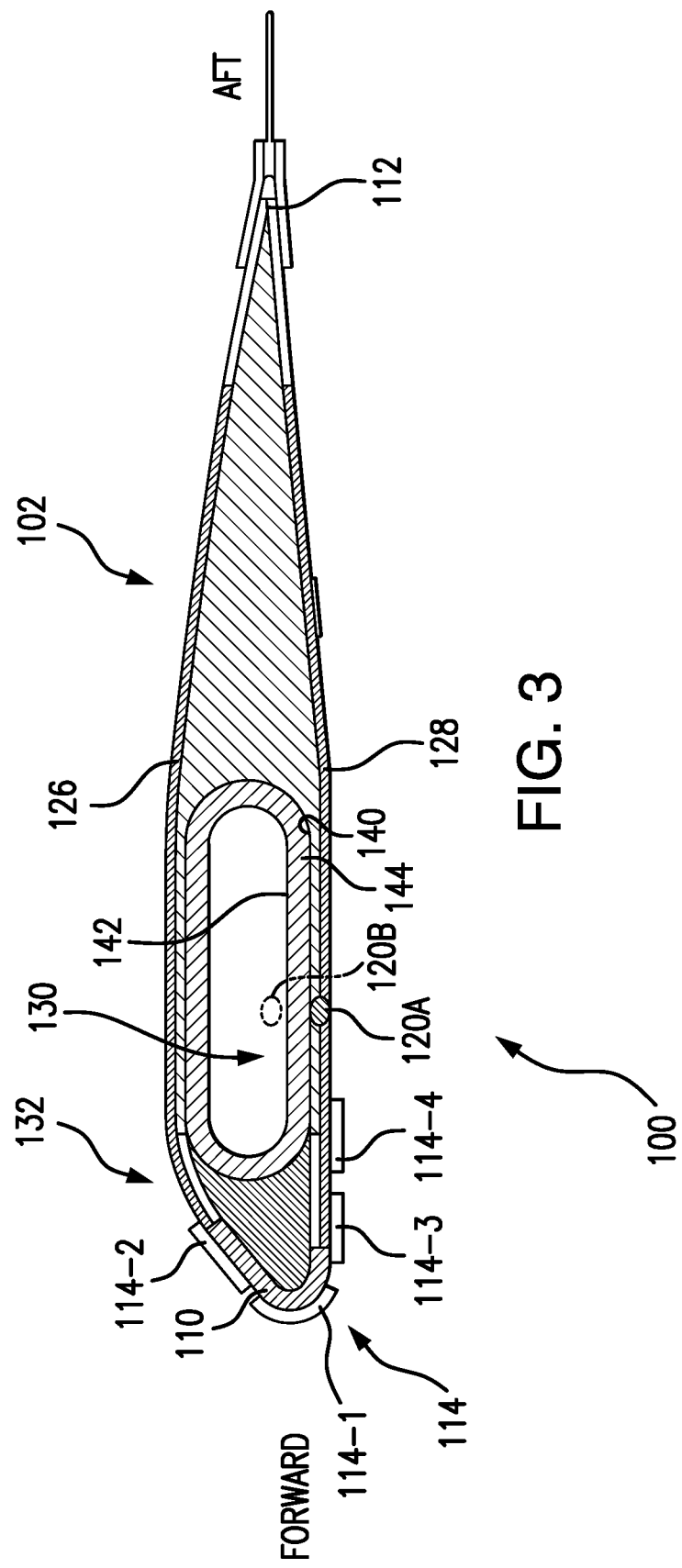
FIG. 3 is cross-sectional chordwise view of the rotary blade of the main rotor system of the rotorcraft of FIG. 1, showing a temperature sensing circuit disposed in proximity to the heater element and within composite body of the blade body of the rotary blade.

With reference to FIG. 3, rotary blade 100 is shown in a chordwise sectional view. Rotary blade 100 includes an upper skin 126 and a lower skin 128. Upper skin 126 is coupled to lower skin 128 at leading edge 110 and trailing edged such that upper skin 126 defines an upper airfoil surface aerodynamic surface and lower skin 128 defines a lower aerodynamic surface. Upper skin 126 and lower skin 128 may include one or more plies of composite material such as woven fiberglass material that are embedded in a suitable resin matrix.

Heater element 114 may include a plurality of heater elements. In the illustrated exemplary embodiment, heater elements includes a first heater element 114-1, a second heater element 114-2, a third heater element 114-3, and a fourth heater element 114-4 which extend spanwise along rotary blade 100 and which are distributed chordwise over the upper and lower airfoil surfaces defined by upper skin 126 and lower skin 128. First heater element 114-1 is connected to rotary blade 100 such that it spans leading edge 110. Second heater element 114-2 is connected to rotary blade 100 aft of first heater element 114-1 and along upper skin 126. Third heater element 114-3 is connected to rotary blade 100 aft of first heater element 114-1 and along lower skin 128. Fourth heater element 114-4 is connected to rotary blade 100 aft of third heater element 114-3 and along lower skin 128. One or more of the heater elements 114 may be a heater mat conformally disposed over the portion of blade body 102 defined by the portions of upper airfoil surface of upper skin 126 and lower airfoil surface of lower skin 128 adjacent to leading edge 110. Examples of such heater mat include heater mats marketed under the trade name Dura-Therm®.

Within its interior rotary blade 100 also includes a spar 130 and a composite body 132. Spar 130 has wall 144 with a thickness that separates an interior surface 142 of spar 130 from an exterior surface 138 of spar 130. In embodiments, one or more heater elements 114 may be incorporated within composite body 132 for preventing and/or dislodging ice accretions that may form thereon during operation under icing conditions.

Temperature sensing circuit 120 is in thermal communication with heater element 114. The thermal communication may be direct, such as through intimate mechanical contact with heater element 114. The thermal communication may be indirect, such as through intervening structures of rotary blade 100. For example, thermal communication may be through one or more of composite body 132, spar 130, upper skin 126, and/or lower skin 128. The thermal communication may be through wall 144 of spar 130. In embodiments, a portion of temperature sensing circuit 120A may be embedded directly within composite body 132. This reduces the need to provide temperature sensing circuit penetrations into the interior of spar 130. In certain embodiments, a portion of temperature sensing circuit 120B may be disposed within the interior of spar 130 and connected to interior surface 142 of spar 130. While potentially requiring penetrations, this arrangement avoid the need to alter the layups of composite body 132 to accommodate the thickness of the wire bodies forming temperature sensing circuit 120 in order to maintain the aerodynamic contour of rotary blade 100. It is contemplated that segments of temperature sensing circuit 120 may be in both direct and indirect thermal communication with heater element 114.

With reference to FIG. 4, RIPS 200 is shown schematically. RIPS 200 includes a control module 202 operatively connected to heating elements 114 and temperature sensing circuit 120 on rotary blades 100 of either or both main rotor system 18 and tail rotor system 20 through a link 204. The link 204 can include wired and/or wireless element, and can further include a slip ring to connect the rotary blades 100 to the airframe 12, which is fixed relative to rotary blades 100. It is contemplated that control module 202 may be located with airframe 12 or within the rotor head of the rotor system.

Control module 202 can be implemented as circuitry, software, or a combination of circuitry and software, and in the illustrated exemplary embodiment includes a processor 206 communicative with a user interface 208 and a memory 210. Memory 210 includes a plurality of program modules 212 having instructions recorded thereon that, when read by processor 206 to undertake certain actions. In this respect the instructions recorded on program modules 212 cause processor 206 (a) determine actual temperature of rotary blades of main rotor system 18 and/or tail rotor system 20 using respective temperature sensing circuits 120 (shown in FIG. 2A) of the respective rotary blade, (b) compare the actual temperature to one or more temperature thresholds 214 associated with the respective rotary blades, and (c) control the temperature of the respective rotary blade based on the comparison of the actual temperature of the rotary blade and the temperature threshold associated with rotary blade. Controlling the temperature of a given rotary blade using the actual temperature of the rotary blade allows for limiting damage to the rotary blade in the event of the malfunction as control module 202 can cease heating the blade prior to portions of the blade proximate heater element 114 (shown in FIG. 2A) reaching a temperature that could damage the rotary blade, such as composite body 132 (shown in FIG. 3). It also allows for the ice protection system to continue to operate not withstanding a malfunction in one rotary blade, as heating of other rotary blades is controlled based on the actual temperature of the other rotary blades.

In embodiments, the instructions recorded on one or more of program modules 212 cause processor 206 to provide a malfunction indication to user interface 208 if the comparison indicates that the actual temperature of the rotary blade is above the temperature threshold. The instructions can also cause control module 202 to cease heating rotary blade 100 if the comparison indicates that the actual temperature of rotary blade 100 is above the temperature threshold. The comparisons can be made of a blade-by-blade basis, and only those blades with actual temperatures exceeding the temperature threshold may be toggled into an inactive state, ice protection remaining active on the blades having actual temperatures that are below the temperature threshold. As will appreciated by those or ordinary skill in the art in view of the present disclosure, actual temperature measurements can be acquired for rotary blades of main rotor system 18, rotary blades of tail rotor system 20 or rotary blades of both main rotor system 18 and tail rotor system 20. As will also be appreciated by those or ordinary skill in the art in view of the present disclosure, rotary blades of different rotor systems may have different temperature thresholds that are reflective of differing construction of the rotary blades of the different rotor systems. This can also be compared with the indirect measurement acquired using the remote sensor, such as ice rate probe 54. Alternatively, the indirect measurement or remote sensor need not be used in certain embodiments.

Although FIG. 4 shows temperature sensing circuit 120 connecting directly to RIPS 200 through link 204, it is to be appreciated and understood that temperature sensing circuit 120 may connect to RIPS 200 independently. For example, temperature sensing circuit 120 may be connected to RIPS 200 through an intervening device or data communications network 204A, as shown in dashed lines in FIG. 4. This allows for temperature sensing circuit 120 to be incorporated as an upgrade kit into an existing aircraft originally configured without temperature sensing circuit 120.

Figure 5:
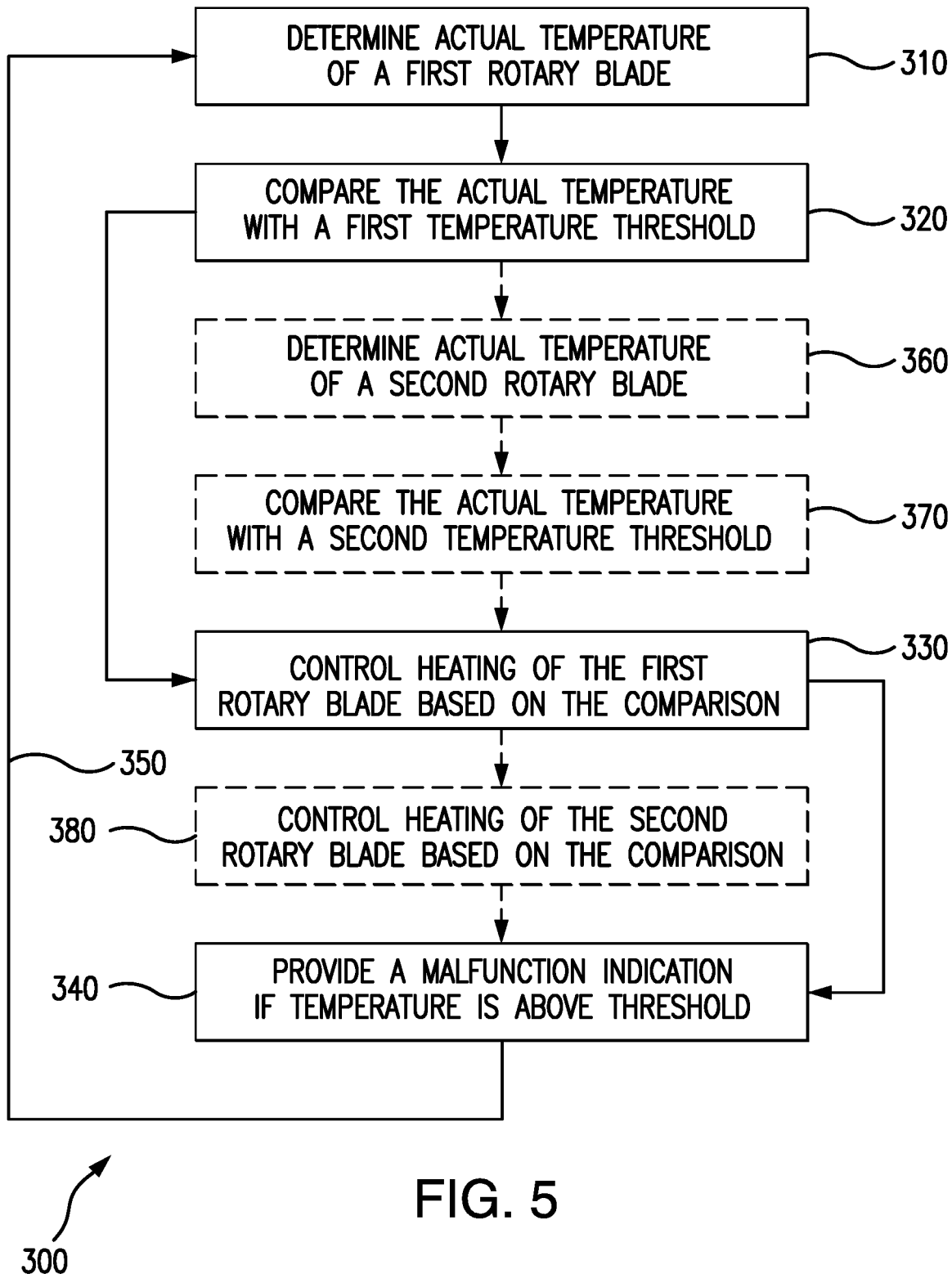
FIG. 5 is a diagram of method of controlling ice accretion on a rotorcraft.

With reference to FIG. 5, a method of controlling ice accretion on a rotary blade is generally indicated with reference numeral 300. Method 300 generally includes controlling heating of the rotary blade by cyclically applying power to one or more heater elements connected to the rotary using data acquired from sensors remote from the rotary blade. In embodiments, a determination of the amount of power applied to the one or more heating elements for a given rotary blade is made independent of the actual temperature of the rotary blade.

Method 300 includes determining actual temperature of the rotary blade, e.g., rotary blade 100 (shown in FIG. 1), as shown with box 310. Determining the actual temperature of the rotary blade can include measuring resistance of a temperature sensing circuit, e.g. temperature sensing circuit 120 (shown FIG. 2A) that is independent of a heater element, e.g., heater element 114 (shown in FIG. 2A). The temperature measurement can be acquired independent of whether the heater element is in an on-state or an off-state. The temperature measurement can be acquired without use of the heater element structure and/or circuitry.

The actual temperature of the rotary blade is compared with a temperature threshold, as shown with box 320. The temperature threshold may be stored within a memory of an ice protection system, e.g., memory 210 (shown in FIG. 4).

It is contemplated that the temperature threshold can be indicative of approach to blade temperatures where the performance of blade structures change, such as where a composite body may soften or become pliable. Based on the comparison of the actual temperature of the rotary blade, heating of the rotary blade may be controlled, as shown with box 330. For example, the heating element may be turned off or power reduced, or the mode toggled from an active to passive mode by way of non-limiting example. In embodiments, in the event that the comparison indicates that the temperature threshold for the rotary has been exceed, a malfunction indication can be provided to a user interface, e.g., user interface 208 (shown in FIG. 4), as shown with box 340. Control of rotary blade heating may be continuous, such as by determining temperature and comparing the temperature periodically to the temperature threshold, as shown is arrow 350.

It is contemplated that control of the heating of one rotary blade of the rotorcraft can be independent of another rotary blade of the rotorcraft. For example, the rotary blade can be a first rotary blade, and method 300 can include determining the actual temperature of a second rotary blade of the same rotor system, as shown with box 360. In embodiments, the first rotary blade can be an element of first rotor system, e.g., a main rotor system, and the second rotary blade can be an element of a second rotor system, e.g., a tail rotor system. The temperature of the second rotary blade can be compared to second temperature threshold, as shown with box 370. Based on the comparison of the actual temperature of the second rotary blade and the second temperature threshold, heating of the second rotary blade can be controlled as shown with box 380. In this respect either of the first and second rotary blades can be heated while the other unheated, such when the result of the comparison indicates that the actual temperature of the other rotary blade exceeded the temperature threshold—and an interval of cooling is necessary due to a heater element malfunction.

The methods and systems of the present disclosure, as described above and shown in the drawings, provide for ice protection systems with superior properties including improved fault detection, fault isolation, and/or fault tolerance. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A rotary blade, comprising:
   a blade body;
   one or more heater elements connected to the blade body;
   a temperature sensing circuit in thermal communication with the blade body, wherein the temperature sensing circuit is electrically isolated from the one or more heater elements for determining actual temperature of the rotary blade independent of operation of the one or more heater elements;
   a heater element source lead connected in series with the one or more heater elements; and
   a heater element return lead connected in series with the one or more heater elements, wherein the temperature sensing circuit is connected to the blade body and electrically isolated from the heater element source lead and the heater element return lead.

2. The rotary blade as associated in claim 1, wherein the blade body includes a composite body, wherein the temperature sensing circuit is connected to the composite body.

3. The rotary blade as recited in claim 2, wherein the temperature sensing circuit is in thermal communication with the one or more heater elements through the composite body.

4. The rotary blade as recited in claim 1, wherein the temperature sensing circuit is connected to the one or more heater elements.

5. The rotary blade as recited in claim 1, wherein the rotary blade includes a spar connected to the blade body, the spar including a hollow interior, and the temperature sensing circuit being disposed within the hollow interior of the spar.

6. The rotary blade as recited in claim 5, wherein the rotary blade includes a spar connected to the blade body and the temperature sensing circuit is connected to an exterior of the spar.

7. The rotary blade as recited in claim 1, further including:
   a temperature sensing circuit source lead connected to the blade body; and
   a temperature sensing circuit return lead connected in series with the temperature
   sensing circuit source lead, wherein the temperature sensing circuit source lead and the temperature sensing circuit return lead are electrically isolated from the heater element source lead and the heater element return lead.

8. The rotary blade as recited in claim 1, wherein the rotary blade includes a root portion connected the blade body, wherein the heater element source lead, the heater element return lead, the temperature sensing circuit source lead, and the temperature sensing circuit return lead span the root portion of the rotary blade.

9. A rotorcraft, comprising:
   a rotor system having a rotary blade as recited in claim 1;
   a control module communicative with the rotary blade temperature sensing circuit and responsive to instructions recorded on a non-transitory machine readable medium, wherein the instructions cause the control module to:
      determine a sensed state of the temperature sensing circuit;
      determine actual temperature of the rotary blade using the sensed state;
      compare the actual temperature to a temperature threshold; and
      cease heating of the rotary blade if the actual temperature of the rotary blade exceeds the temperature threshold.

10. The rotorcraft as recited in claim 9, further including a user interface connected to the control module, wherein the instructions cause the control module to provide a malfunction indication to the user interface if the actual temperature exceeds the temperature threshold.

11. The rotorcraft as recited in claim 9, wherein determining actual temperature includes correlating resistance with temperature.

12. A rotorcraft, comprising:
   a rotor system, comprising:
      a first rotary blade having a blade body, one or more heater elements connected to the blade body, and a temperature sensing circuit in thermal communication with the blade body, wherein the temperature sensing circuit is electrically isolated from the one or more heater elements for determining actual temperature of the first rotary blade independent of operation of the one or more heater elements;
      a second rotary blade having a blade body, one or more heater elements connected to the blade body, and a temperature sensing circuit in thermal communication with the blade body, wherein the temperature sensing circuit is electrically isolated from the one or more heater elements for determining actual temperature of the second rotary blade independent of operation of the one or more heater elements; and a control module communicative with the rotary blade temperature sensing circuit and responsive to instructions recorded on a non-transitory machine readable medium, wherein the instructions cause the control module to:
determine a sensed state of the temperature sensing circuit;
determine actual temperature of the rotary blade using the sensed state;
compare the actual temperature to a temperature threshold; and
cease heating of the rotary blade if the actual temperature of the rotary blade exceeds the temperature threshold,
wherein the instructions cause the control module to cease heating of the first rotary blade independent of heating of the second rotary blade based on the actual temperature.

13. The rotorcraft as recited in claim 12, wherein the first rotary blade and the second rotary blade are main rotor blades of a helicopter rotorcraft.

14. The rotorcraft as recited in claim 12, wherein the temperature threshold is a first temperature threshold associated with the first rotary blade, and further including a second temperature threshold associated with the second rotary blade, wherein the first temperature threshold is lower than the second temperature threshold.

15. The rotorcraft as recited in claim 14, wherein one of the first rotary blade and the second rotary blade is a main rotor blade, wherein the other of the first rotary blade and the second rotary blade is a tail rotor blade.

16. The rotorcraft as recited in claim 9, wherein the rotary blade is a first rotary blade and further including a second rotary blade, wherein the instructions cause the control module to cease heating of the both the first rotary blade and the second rotary blade if the actual temperature of the first rotary blade or the second rotary blade is greater than the temperature threshold.

17. A method of controlling ice accretion on a rotary blade, comprising:
applying power to a heater element connected to a rotary blade;
determining actual temperature of the rotary blade using a sensor on the rotary blade;
comparing the actual temperature to a predetermined temperature; and
ceasing cyclical application of power to the heater element if the actual temperature is greater than the predetermined temperature,
wherein applying power to the heater element comprises communicating electrical power from a power source carried by an airframe to a source lead coupled to a root portion of the rotary blade.

18. A method of controlling ice accretion on a rotary blade, comprising:
applying power to a heater element connected to a rotary blade;
determining actual temperature of the rotary blade using a sensor on the rotary blade;
comparing the actual temperature to a predetermined temperature; and
ceasing cyclical application of power to the heater element if the actual temperature is greater than the predetermined temperature,
wherein the rotary blade is a first rotary blade, and further including:
determining actual temperature of a second rotary blade using a second temperature sensing circuit;
comparing the actual temperature of the second rotary blade to the temperature threshold; and
controlling heating of the second rotary blade independently of the actual temperature of the first rotary blade.

19. A rotary blade, comprising:
a blade body;
one or more heater elements connected to the blade body;
a temperature sensing circuit in thermal communication with the blade body, wherein the temperature sensing circuit is electrically isolated from the one or more heater elements for determining actual temperature of the rotary blade independent of operation of the one or more heater elements,
wherein the temperature sensing circuit is in direct thermal communication with the one or more heater element.

* * * * *